(12) United States Patent
Gong

(10) Patent No.: US 7,930,002 B2
(45) Date of Patent: Apr. 19, 2011

(54) METHOD FOR USING MULTI-FUNCTION KEY IN A PORTABLE PHONE

(75) Inventor: Sung-Hwa Gong, Kumi-shi (KR)

(73) Assignee: Samsung Electronics Co., Ltd (KR)

( * ) Notice: Subject to any disclaimer, the term of this patent is extended or adjusted under 35 U.S.C. 154(b) by 927 days.

(21) Appl. No.: 11/228,627

(22) Filed: Sep. 16, 2005

(65) Prior Publication Data

US 2006/0019717 A1    Jan. 26, 2006

Related U.S. Application Data

(62) Division of application No. 09/540,180, filed on Mar. 31, 2000, now abandoned.

(30) Foreign Application Priority Data

Apr. 2, 1999  (KR) .................................. 1999-11667

(51) Int. Cl.
*H04M 1/00* (2006.01)

(52) U.S. Cl. .................. 455/575.1; 455/575.4; 455/519; 455/518; 455/500; 455/574

(58) Field of Classification Search .................. 455/519, 455/517, 518, 500, 574, 572, 458; 370/311
See application file for complete search history.

(56) References Cited

U.S. PATENT DOCUMENTS

| | | | | |
|---|---|---|---|---|
| 5,159,713 A | * | 10/1992 | Gaskill et al. | 455/344 |
| 5,303,421 A | * | 4/1994 | Goldenberg | 455/344 |
| 5,309,153 A | * | 5/1994 | Gaskill et al. | 340/7.33 |
| D354,488 S | * | 1/1995 | Hutcheson | D14/192 |
| 5,537,407 A | * | 7/1996 | Park et al. | 370/314 |
| 5,703,947 A | | 12/1997 | Hino et al. | |
| 5,825,353 A | | 10/1998 | Will | |
| 5,861,823 A | | 1/1999 | Strauch et al. | |
| 5,905,964 A | | 5/1999 | Sudo | |
| 5,915,228 A | | 6/1999 | Kunihiro et al. | |
| 5,966,671 A | * | 10/1999 | Mitchell et al. | 455/550.1 |
| 6,049,336 A | | 4/2000 | Liu et al. | |

(Continued)

FOREIGN PATENT DOCUMENTS

CN            1167390 A        12/1997

(Continued)

OTHER PUBLICATIONS

First Office Action of the Patent Office of the People's Republic of China dated Aug. 9 issued in a counterpart application, namely, Appln. No. 00104822.8.

*Primary Examiner* — Nay Maung
*Assistant Examiner* — Richard Chan
(74) *Attorney, Agent, or Firm* — The Farrell Law Firm, P.C.

(57) ABSTRACT

A method for using a multi-function key for a portable phone having a multi-function key for generating a plurality of input signals. First, menu items are displayed in a main menu upon generation of a first input signal according to manipulation of multi-function key in a stand-by state, an intended menu item is shifted to by generating a second input signal by manipulating the multi-function key, and the menu item is selected by generating a third input signal by manipulating the multi-function key.

14 Claims, 14 Drawing Sheets

U.S. PATENT DOCUMENTS

| | | | |
|---|---|---|---|
| 6,064,725 A | 5/2000 | Nakanishi | |
| 6,157,323 A | 12/2000 | Tso et al. | |
| 6,178,338 B1 * | 1/2001 | Yamagishi et al. | 455/566 |
| 6,201,534 B1 | 3/2001 | Steele et al. | |
| 6,300,934 B1 | 10/2001 | Ko et al. | |
| 6,430,314 B1 | 8/2002 | Ko | |
| 6,529,713 B1 | 3/2003 | Seymour | |
| 6,873,317 B1 | 3/2005 | Griffin et al. | |
| 7,561,902 B2 * | 7/2009 | Jo | 455/575.1 |
| 2002/0080186 A1 | 6/2002 | Frederiksen | |
| 2008/0051041 A1 * | 2/2008 | Griffin et al. | 455/90.3 |
| 2010/0167791 A1 * | 7/2010 | Lim | 455/566 |
| 2010/0248796 A1 * | 9/2010 | Higashigawa et al. | 455/575.4 |

FOREIGN PATENT DOCUMENTS

| | | |
|---|---|---|
| GB | 2 335 822 A | 9/1999 |
| JP | 09-305361 | 11/1997 |
| KR | 20000026870 | 5/2000 |
| WO | WO 98/49816 | 11/1998 |

* cited by examiner

SINGLE-STAGE MULTI-FUNCTION KEY

TWO-STAGE MULTI-FUNCTION KEY

THREE-STAGE MULTI-FUNCTION KEY

FOUR-STAGE MULTI-FUNCTION KEY

N-STAGE MULTI-FUNCTION KEY

ROTARY MULTI-FUNCTION KEY

METHOD FOR USING MULTI-FUNCTION KEY IN A PORTABLE PHONE

PRIORITY

This application is a Divisional of U.S. application Ser. No. 09/540,180, filed on Mar. 31, 2000 now abondoned, which claims priority to an application entitled "Method for using a multi-function key for Portable Phone" filed in the Korean Industrial Property Office on Apr. 2, 1999 and assigned Serial No. 99-11667, the contents of which are hereby incorporated by reference.

BACKGROUND OF THE INVENTION

1. Field of the Invention

The present invention relates generally to a key input method to implement multiple functions in a portable phone, and in particular, a method for using a multi-function key for implementing in a portable phone multiple functions such as input of telephone numbers and characters with a single key.

2. Description of the Related Art

Various practical electronic appliances of original design have recently been put on the market along the trend toward consumer convenience and respect for individuality. Among them, a mobile radio terminal such as a portable phone is designed and fabricated in such a manner that the consumer demands for originality and practicality combined are satisfied. Generally, a communication service provider offers a mailbox service (voice/data mailbox service) as an additional service to a mobile subscriber of a cellular phone or a PCS (Personal Communication Service). The mail box service notifies a calling party that a called party is not available when the portable phone of the called party is in a power-off mode or located in a non-service area, stores a voice message or data of the calling party in a mail box of a base station, and informs the called party of receipt of the voice message or data stored in the mail box when the called party is available.

Electronic appliances are equipped with multiple functions to enhance consumer's satisfaction. To invoke the multiple functions, a plurality of keys are provided with the electronic products. For example, a mobile terminal includes a plurality of keys such as the conventional 3×4 alphanumeric keys, function keys, an up/down key, and a menu key to perform functions like dialing and name registering.

From the user's perspective, many keys in a portable phone give rise to manipulation confusion and inconvenience rather than user-friendliness because users are obliged to learn what functions each of the multiple keys are used for. Multiple keys are not favorable to manufacturers since a large area occupied by the keys imposes constraints on product design and makes it difficult to satisfy various consumer tastes.

Though the idea of using the 3×4 keys for input of digits/characters and dialing has been fixedly accepted, a new and simple digit/character input method is needed.

SUMMARY OF THE INVENTION

It is, therefore, an object of the present invention to provide a method for using a multi-function key for implementing multiple functions with a single key in an electronic product, especially a mobile communication terminal like a portable phone.

It is another object of the present invention to provide a method for using a multi-function key that allows a portable phone to be fabricated in an intended design without size constraints through the provision of a multi-function key.

It is a further object of the present invention to provide a method for using a multi-function key that is simpler to that of methods of using the conventional 3×4 key mechanism.

It is still another object of the present invention to provide a method for using a multi-function key for entering digits/characters and dialing with a single multi-function key.

It is yet another object of the present invention to provide a method for using a multi-function key to enable a user of a portable phone to set multiple functions with a single multi-function key.

Briefly, these and other objects can be achieved by providing a portable phone having a multi-function key for generating a plurality of input signals. First, menu items are displayed in a main menu upon generation of a first input signal by manipulating the multi-function key in a stand-by state, a menu item among a plurality of menu items is shifted to by generating a second input signal by manipulating the multi-function key, and the menu item is selected by generating a third input signal by manipulating the multi-function key.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
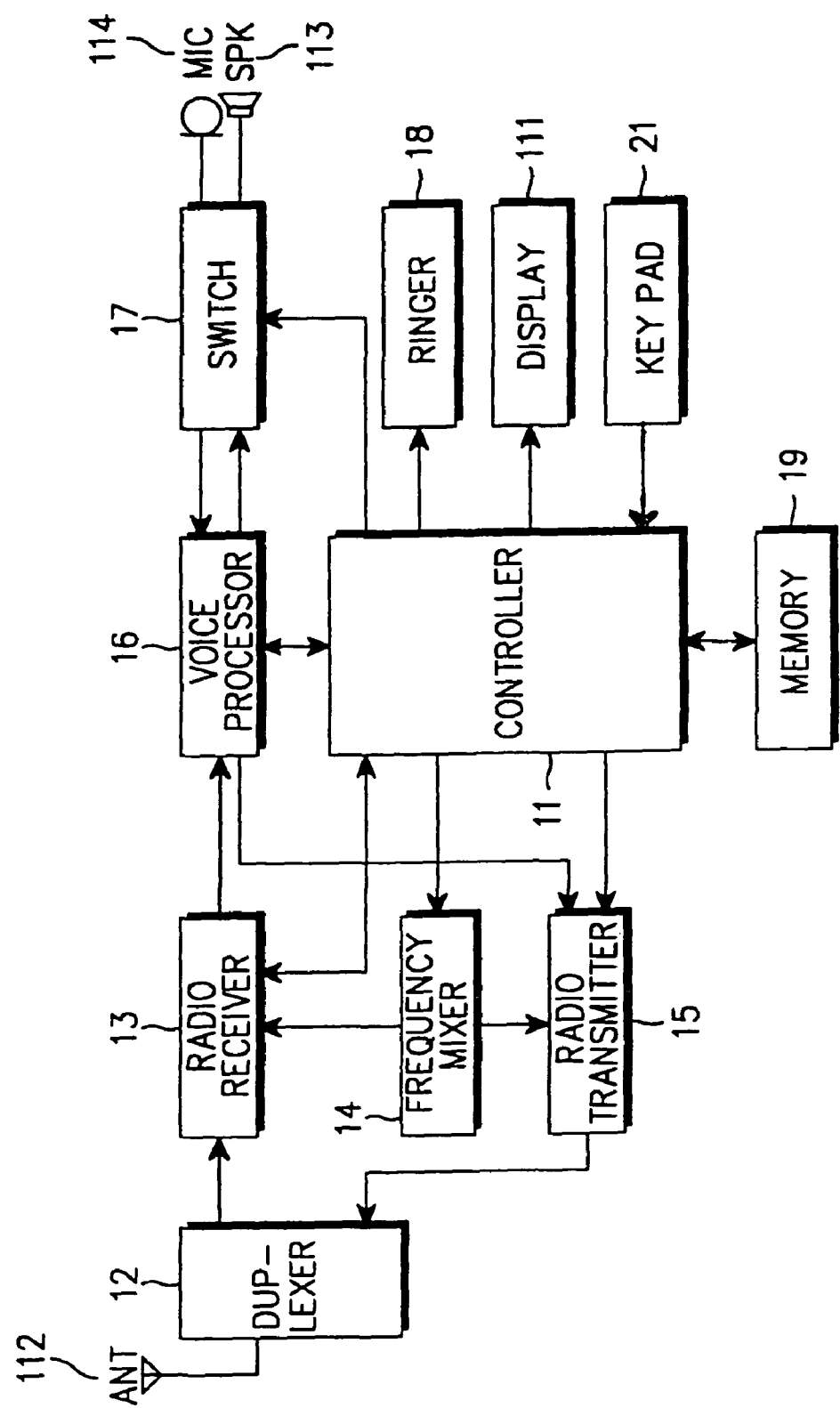
FIG. 1 is a block diagram of a portable phone to which the present invention is applied.

FIG. 1 is a block diagram of a portable phone to which the present invention is applied.

In FIG. 1, a controller 11 provides overall control to the portable phone and controls a corresponding function to be invoked according to a multi-function key input method in a keypad 21. A duplexer 12 feeds a radio signal received through an antenna (ANT) 112 to a radio receiver 13 and outputs a transmission signal received from a radio transmitter 15 through the antenna 112. The radio receiver 13 transmits received data to the controller 11 and a received radio voice signal to a voice processor 16 in a speech mode. A frequency mixer 14 generates a carrier cancellation signal to cancel an input carrier signal corresponding to an input channel under the control of the controller 11 and feeds the carrier cancellation signal to the controller 11. The frequency mixer 14 also generates a transmission carrier signal and transmits the transmission carrier signal to the radio transmitter 15. The radio transmitter 15 combines a voice signal received from the voice processor 16 with the carrier signal received from the frequency mixer 14 and feeds the combined signal to the duplexer 12 in the speech mode under the control of the controller 11. The voice processor 16 demodulates encoded voice data received from the radio receiver 13 and outputs the demodulated voice to a speaker (SPK) 113 through a switch 17. The voice processor 16 encodes an electrical voice signal received from a microphone (MIC) 114 through the switch 17 and transmits the encoded voice data to the radio transmitter 15.

A ringer 18 generates a ring sound upon receipt of a ring signal under the control of the controller 11. A memory 19 includes a ROM for storing programs required for the control operation of the controller 11, a non-volatile memory for storing telephone numbers and names, and a RAM for temporarily storing data generated during execution of the programs.

The keypad 21 has a multi-function key, and generates a plurality of key signals corresponding to user inputs using the multi-function key, and transmits the key signals to the controller 11. A display 111 is preferably an LCD (Liquid Crystal Display), for example, and displays the status and operation of the portable phone under the control of the controller 11.

In a preferred embodiment of the present invention, information corresponding to a function selected by a user is displayed on the display 111 under the control of the controller 11. Upon receipt of corresponding multi-function key input signals, the display 111 displays information corresponding to digits (see, FIGS. 9A to 9C and FIG. 9G), characters (see FIG. 10), and symbols (see FIGS. 9E and 9F), which according to the current technology would be input by the 3×4 keys, function keys, up/down keys, and menu keys.

Figure 2:
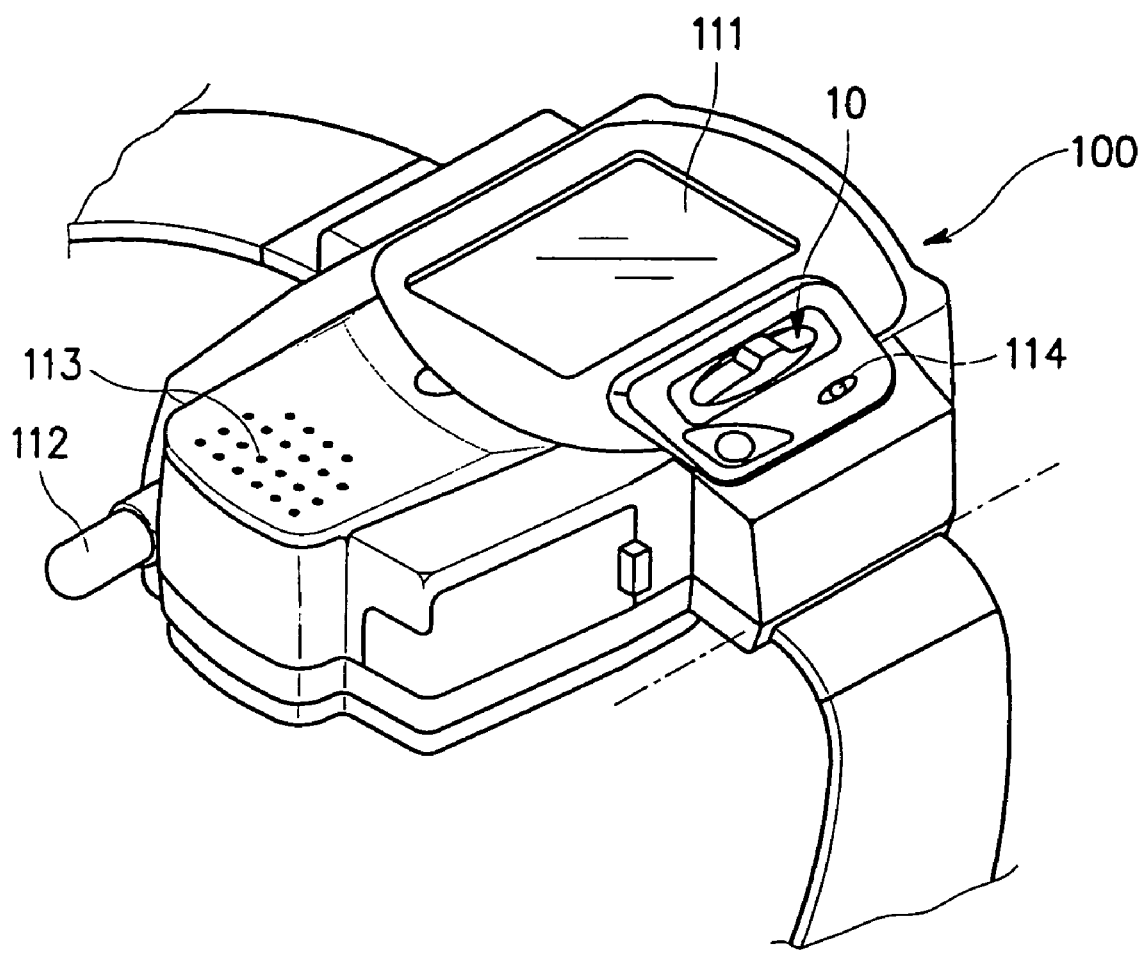
FIG. 2 is a perspective view of a watch-type portable phone with a multi-function key depicting an embodiment of the present invention.

FIG. 2 is a perspective view of a watch-type portable phone 100 depicting an embodiment of the present invention. The portable phone includes a two-stage sliding key 10 as a multi-function key. The multi-function key 10 generates multiple key input signals depending on key presses, key slides to the left, and key slides to the right.

Figure 3:
FIG. 3 illustrates examples of a multi-function key according to an embodiment of the present invention.
Figure 3:
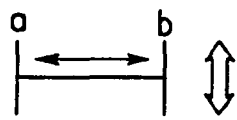
Figure 3:
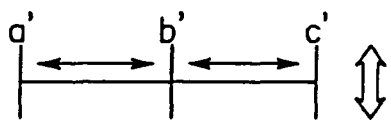
Figure 3:
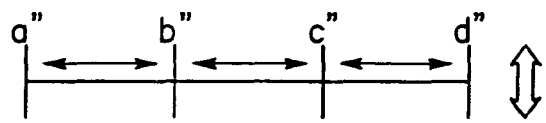
Figure 3:
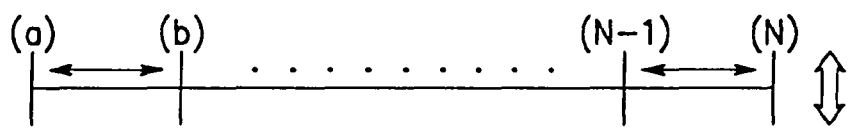
Figure 3:
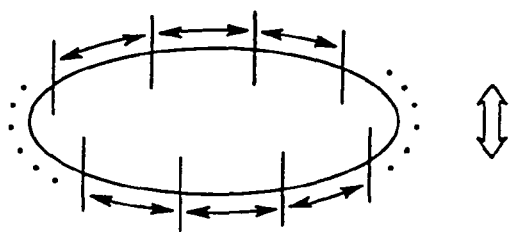

FIG. 3 illustrates various multi-function keys of an integrated multi-stage structure and a rotary structure according to the present invention. In FIG. 3, for generation of an input signal, a single-stage multi-function key is pressed down, a two-stage multi-function key is pressed down or is slide right or left, a three or more-stage multi-function key is pressed down or slide to another stage, and a rotary multi-function key is pressed down or turned. Different functions are invoked according to the number of presses, the duration of a press, and a sliding length. This list is not meant to be inclusive of all possible embodiments of a multi-function key, as any type of multi-function key can be incorporated into the present invention.

Figure 4:
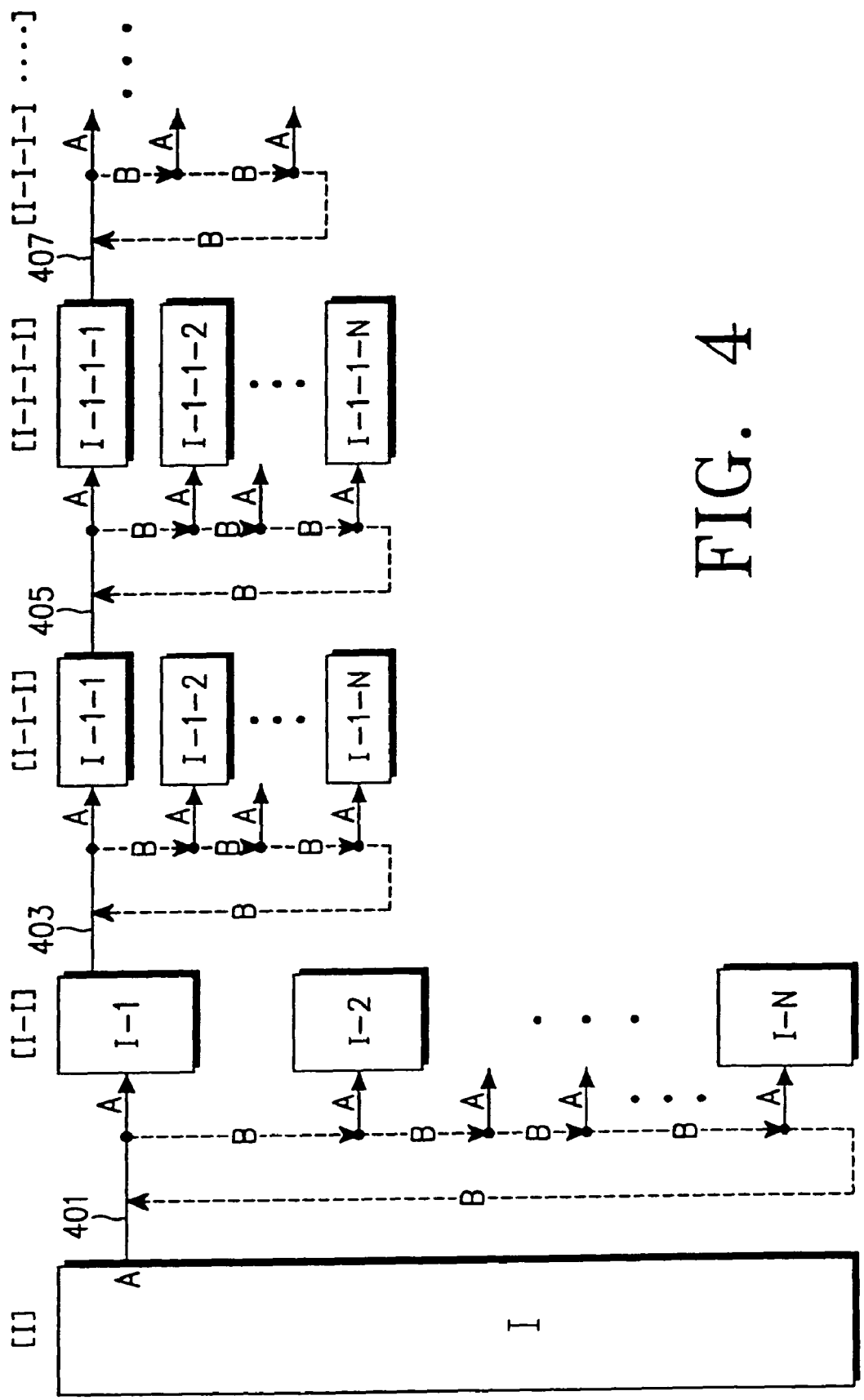
FIG. 4 is a diagram depicting an example of a menu structure and the paths taken by manipulating the multi-function key according to an embodiment of the present invention.

FIG. 4 illustrates a function selecting method using a multi-function key in a function menu mode with multiple stages and multiple functions according to the present invention.

Referring to FIG. 4, [I-I], [I-I-I], [I-I-I-I], . . . , [I-I-I-I- . . . ] are sub-menus of a main menu [I]. Various child menus are displayed in the corresponding parent menus (e.g., I-1, I-2, . . . , I-N in [I-I]). A parent menu is a particular sub-menu containing one or more child menus.

Reference character A in FIG. 4 indicates a first input signal or first input method of the multi-function key used to select either a specific sub-menu in the main menu window or a specific child menu in a particular parent menu window. A solid line represents a transition from the main menu to a sub-menu or from a parent menu to a child menu.

Reference character B in FIG. 4 indicates a second input signal or second input method of the multi-function key used to shift to another child menu in the same parent menu window. A dotted line represents a transition from one child menu to another child menu.

For example, to select I-1-2 in FIG. 4, a user chooses the first multi-function key input method on the main menu window [I]. Then, the procedure goes in a path indicated by 401 so that child menus I-1, I-2, . . . , I-N under a parent menu [I-I] are displayed on the LCD and a blinking cursor is placed on I-1. The user selects the first multi-function key input method to choose I-1 and then the procedure goes in a path indicated by 403. Child menus I-1-1, I-1-2, . . . , I-1-N under a parent menu [I-I-I] are displayed on the LCD and the blinking cursor is located on I-1-1. To shift to I-1-2, the user selects the second multi-function key input method so that the cursor moves to and blinks on the next child menu I-1-2 under the same parent menu. In this state, the user selects the first multi-function key input method to thereby choose I-1-2.

In the above example, the first multi-function key input method may be defined by pressing the key down one time and the second multi-function key input method by two successive press-downs. Alternatively, the input methods can be distinguished from each other according to the duration of key press. The multi-function key input methods will be described in reference to FIGS. 6 and 7.

Consequently, any menu item can be accessed with use of a single multi-function key.

Figure 5:
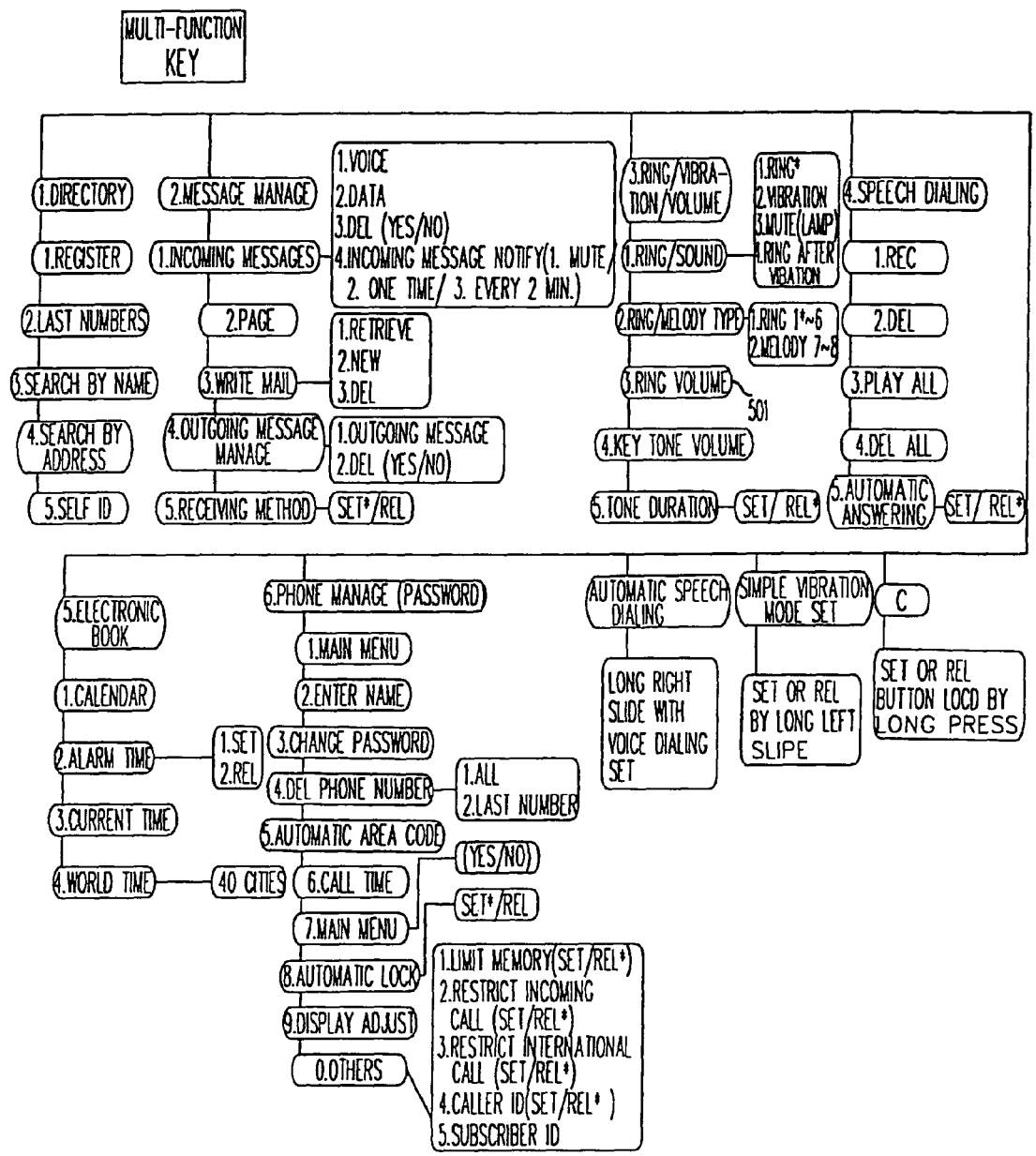
FIG. 5 illustrates an example of a function menu list available in the function menu mode shown in FIG. 4.

FIG. 5 illustrates an example of a function menu list for a portable phone according to the function selecting methods using a multi-function key shown in FIG. 4. For example, as described in the above method of FIG. 4, the user can select the child menu item "3.RING VOLUME" indicated by reference numeral 501 by utilizing the above method of FIG. 4.

Figure 6:
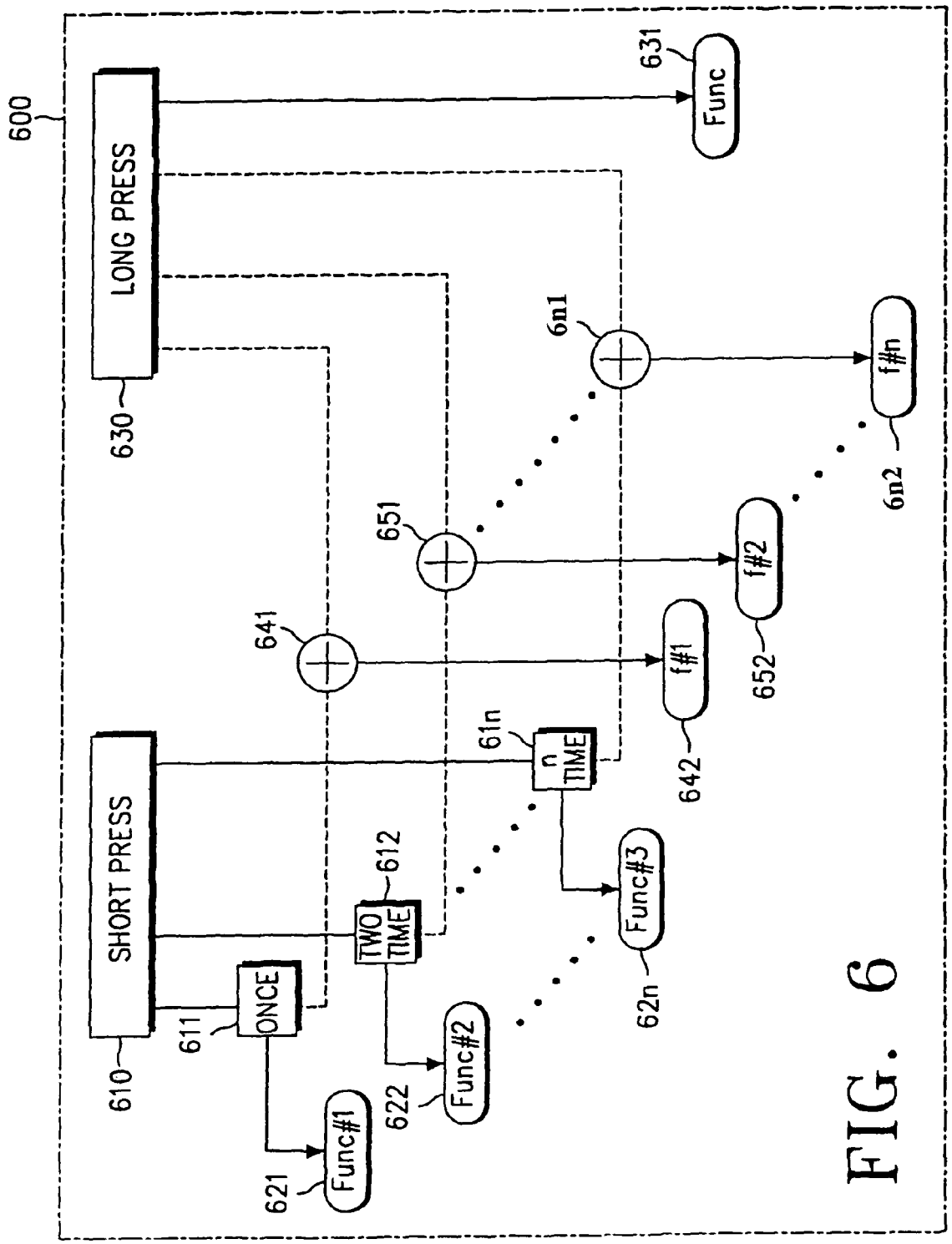
FIG. 6 illustrates the total number of possible functions generated with a single-stage multi-function key according to an embodiment of the present invention.

FIG. 6 illustrates the total number of functions produced with a single-stage multi-function key according to an embodiment of the present invention. By way of example, the first and second input methods in FIG. 4 are defined as "short press" and "long press", respectively. According to the number of "short presses" 610, there exist the cases of "1 short presses" 611, "2 short presses" 612, . . . , "n short presses" 61n. Each individual case can be assigned a unique function, that is, Func#1 621 to Func#n 62n. Other functions, f#1 through f#n, are derived from combinations of "short press" 610 and "long press" 630, such as (611+630) 641, (612+630) 651, through to (61n+630) 6n1.

As in the prior art, as the total number of the key presses to accomplish a particular task is increased the user feels more and more inconvenienced. It is therefore preferable to limit the number of multi-function key manipulations required to complete a particular task to an optimal value. For example, if the number of "short presses" is limited to three, a total of seven function input methods are produced, including, 1 short press, 2 short presses, 3 short presses, long press, 1 short press+long press, 2 short presses+long press, and 3 short presses+long press.

Figure 7:
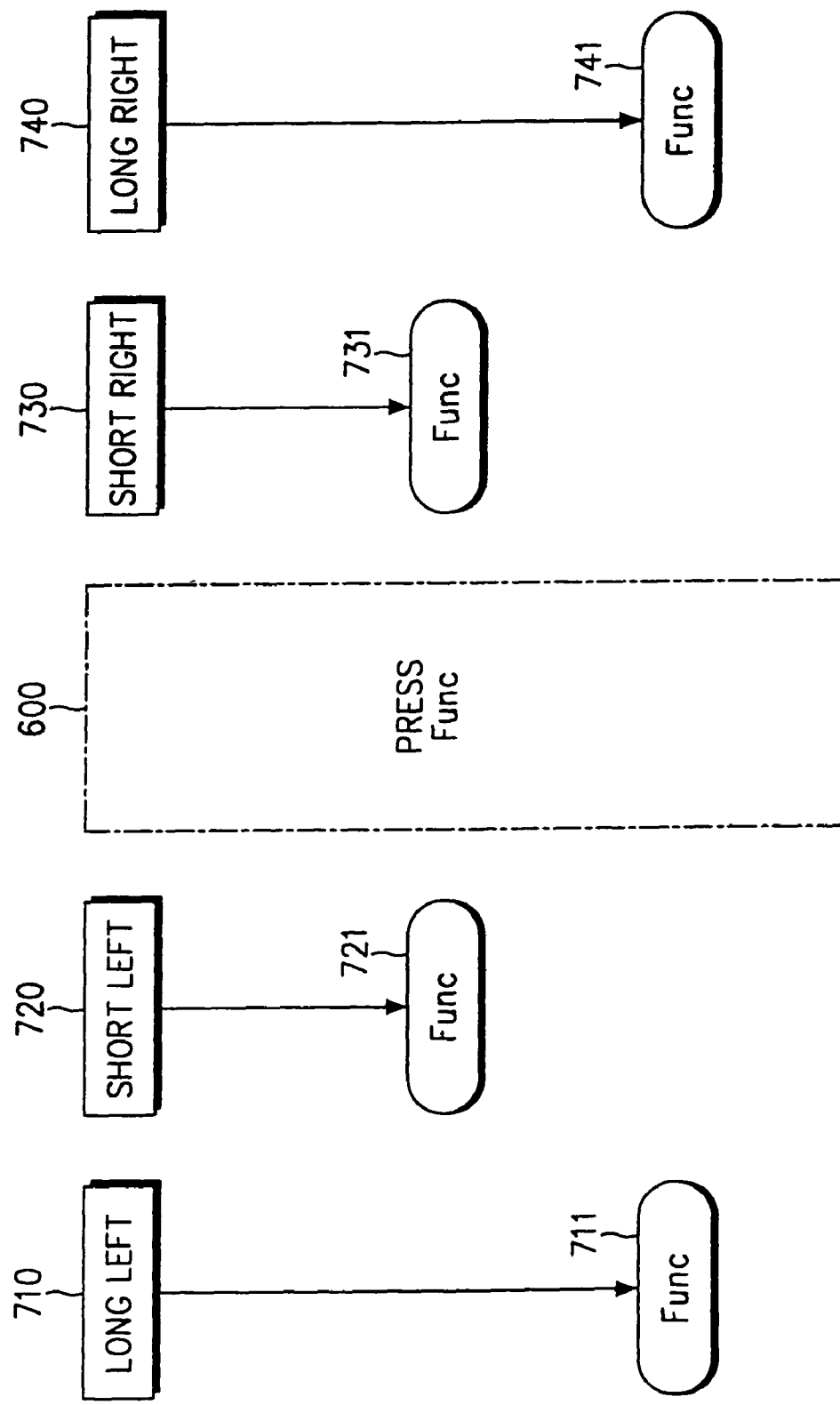
FIG. 7 is a simple illustration of a two-stage sliding multi-function key according to an embodiment of the present invention.

A multi-stage multi-function key will be described in connection to FIG. 7. FIG. 7 illustrates the number of function input methods possibly generated with a two-stage sliding multi-function key. Here, the multi-function key is of the structure 10 shown in FIG. 2 and implemented by pressing down, sliding right, or sliding left as shown in FIG. 3. That is, the integrated two-stage sliding multi-function key involves functions possibly generated by pressing down 600 and functions 711, 721, 731, and 741 by right and left sliding, i.e., "left short" 720, "left long" 710, "right short" 730, and "right long" 740.

In light of the foregoing, a multi-function key in the present invention is a single key capable of generating a plurality of input signals. Therefore, a fewer number of keys, including a multi-function key, may be substituted for the existing keypad having the conventional plurality of keys. Though function input methods and the number of possible function input methods have been described in the context of a single-stage multi-function key and a two-stage multi-function key in the embodiment of the present invention, they can also be contemplated in connection with other multi-stage multi-function keys and the rotary-type multi-function key shown in FIG. 3, and by the duration and number of key presses and key slides in various combinations. In addition, the multi-function key is not limited to an integrated slide type but can be, for example, a vertical multi-stage structure.

There will be given a description of a method for using a multi-function key for a portable phone having the two-stage sliding type multi-function key shown in FIGS. 2, 3, and 7.

Figure 8A:
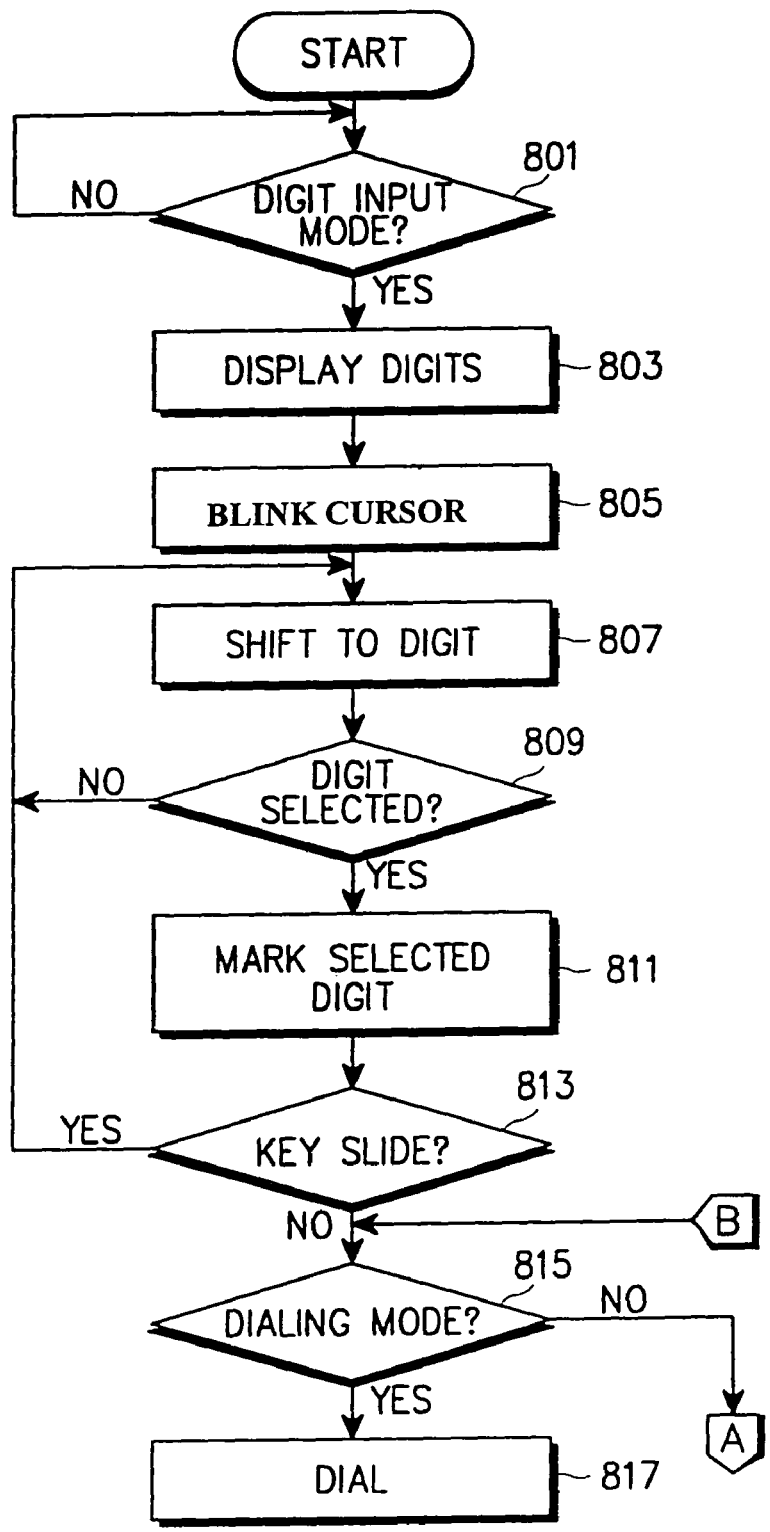
FIGS. 8A, 8B, and 8C are flowcharts illustrating a method for using a multi-function key for input of digits/characters using a multi-function key in a portable phone according to an embodiment of the present invention.
Figure 8B:
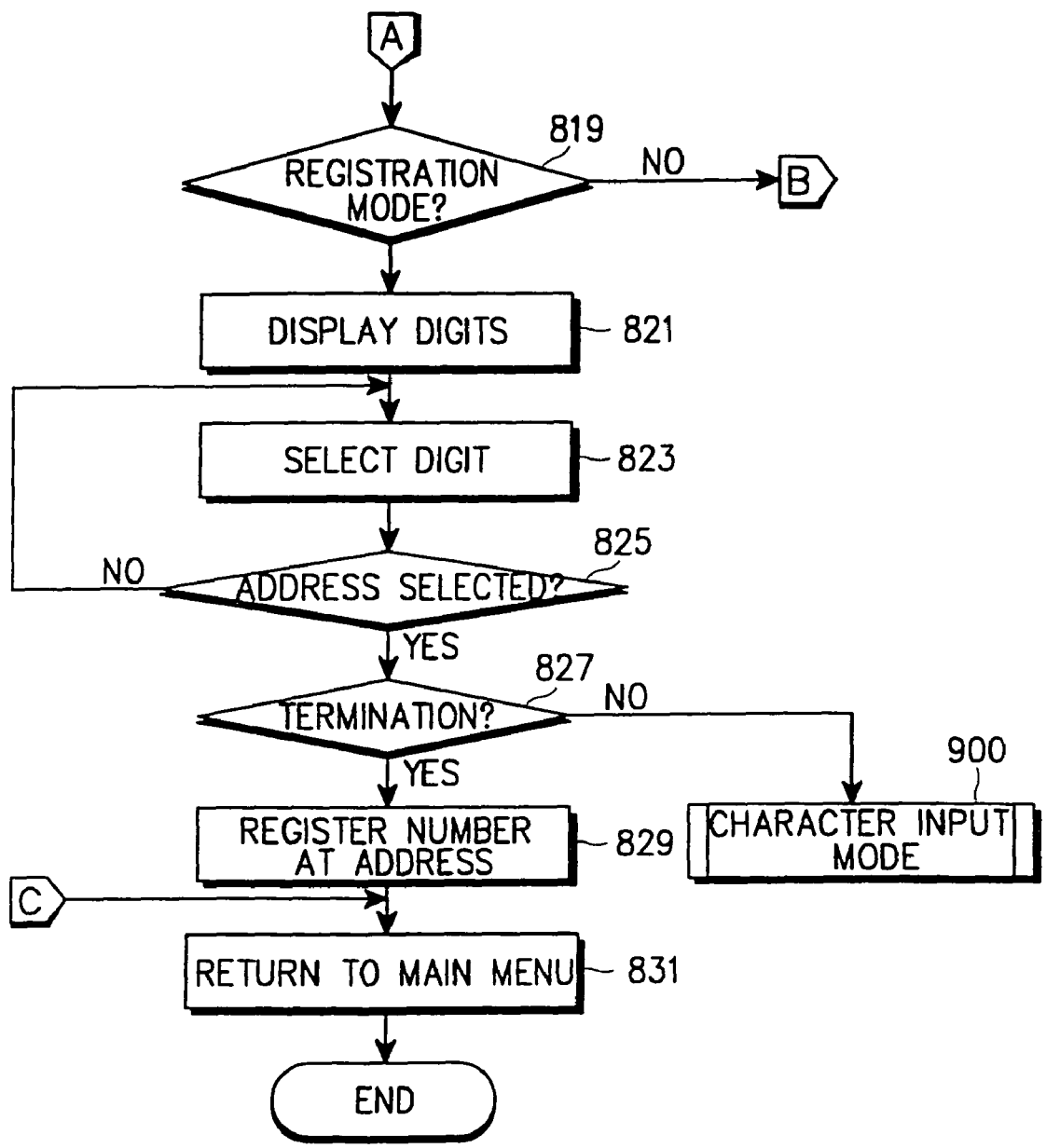
Figure 8C:
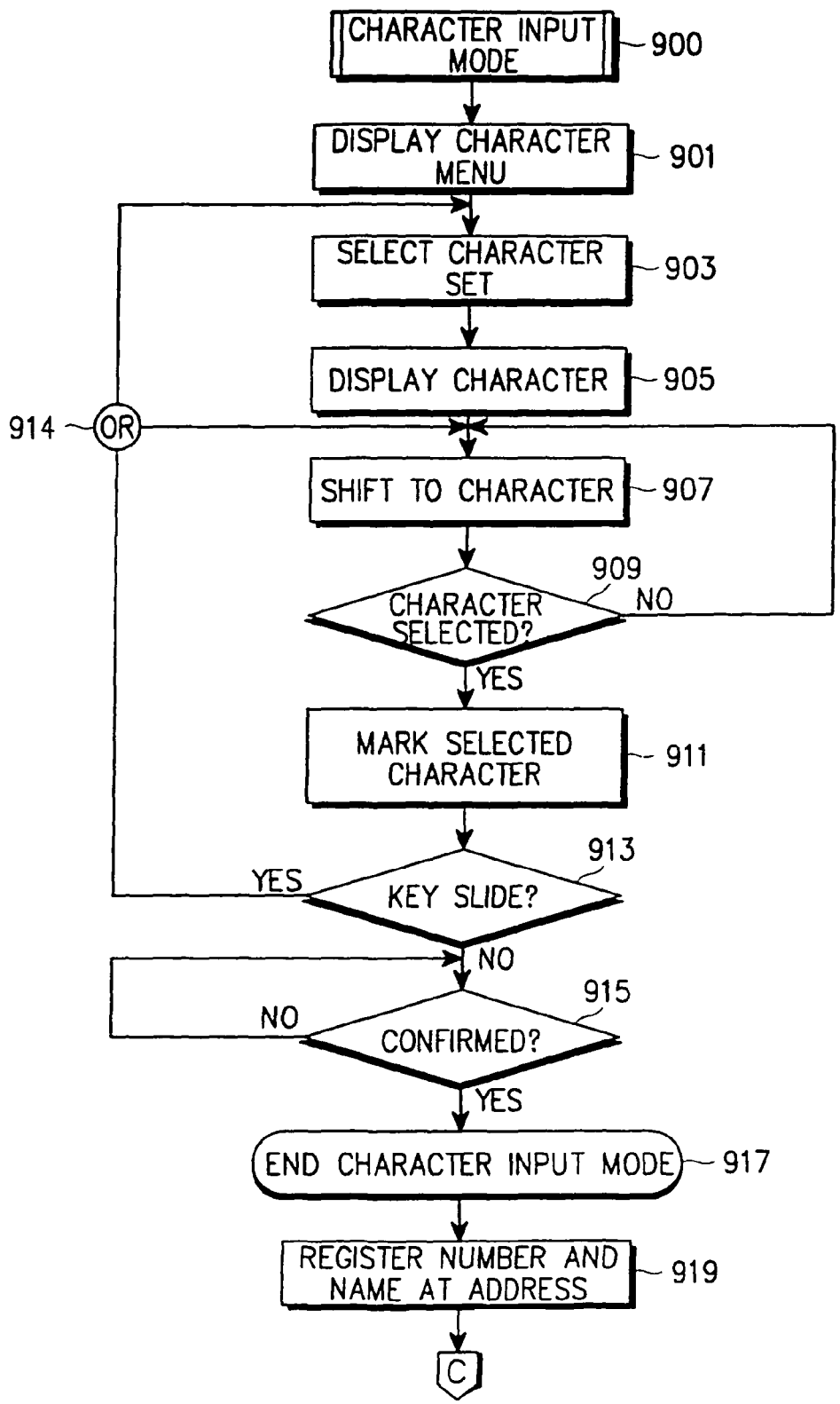
Figure 9A:
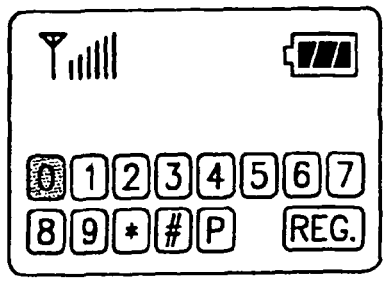
FIGS. 9A to 9G illustrate the display of a portable phone including digits/characters displayed by manipulating a multi-function key in the methods shown in FIGS. 8A, 8B, and 8C.
Figure 9B:
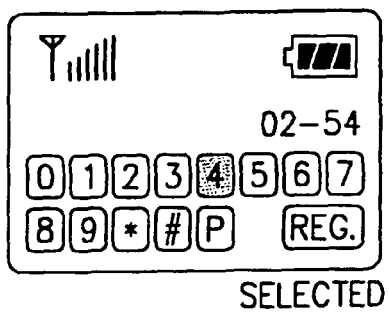
Figure 9C:
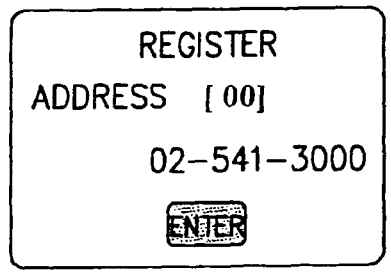
Figure 9D:
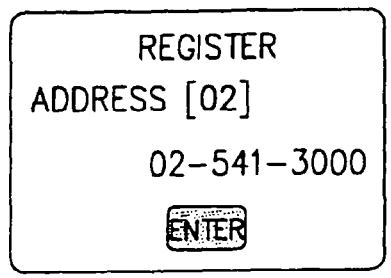
Figure 9E:
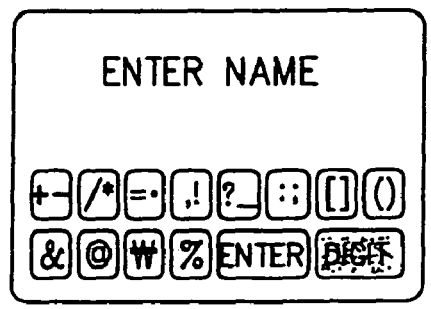
Figure 9F:
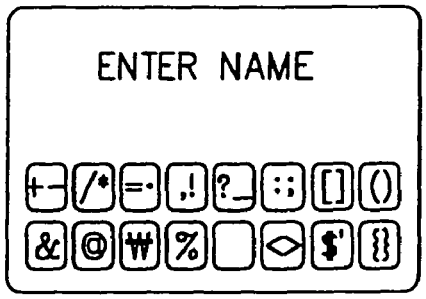
Figure 9G:
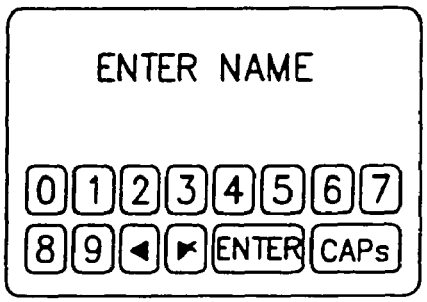
Figure 10:
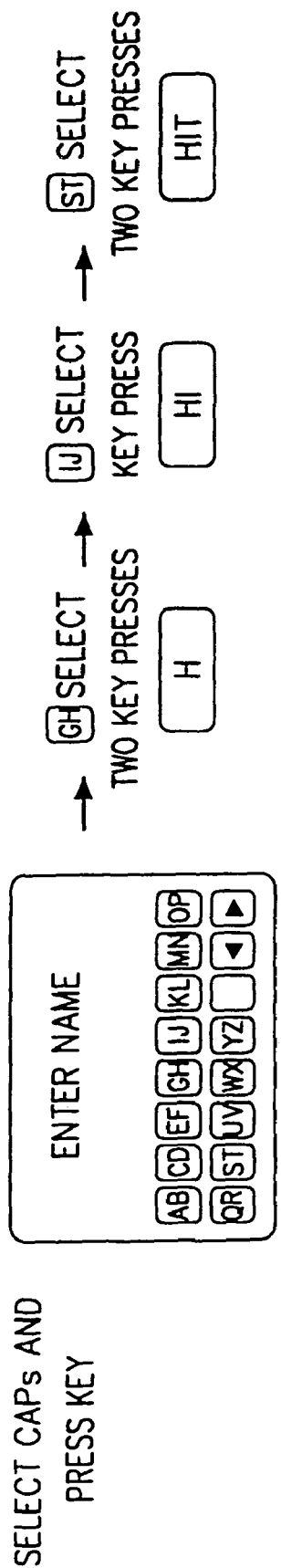
FIG. 10 illustrates the display of a portable phone showing a method to input English capital letters using the multi-function key according to an embodiment of the present invention.

FIGS. 8A, 8B, and 8C are flowcharts illustrating a digit/character input method using a multi-function key for a portable phone according to an embodiment of the present invention. FIGS. 9A to 9G illustrate information displayed on an LCD window according to a multi-function key input method. FIG. 10 illustrates an example of the entry of English capital letters with the multi-function key in an English capital letter input mode on the LCD window.

Digit/character entry using the multi-function key is characterized by user selection of digits (FIGS. 9A to 9C and FIG. 9G) and characters (FIGS. 9E and 9F) by sliding the multi-function key right and left. Telephone number dialing, telephone number registering, and character entry will be described referring to FIG. 8A to 8C. The present invention is described on the assumption that the keypad 21 includes only the multi-function key or that it includes a send key, an end key, and a clear key as well as the multi-function key 10, depending on circumstances.

If the multi-function key 10 of the keypad 21 is pressed down long or the send key is pressed in a stand-by state, the controller 11 considers that a digit-input mode is set in step 801. In step 803, the controller 11 controls pre-stored digits to be displayed on the LCD with a blinking cursor located on a specific digit in step 805, as shown in FIG. 9A. A shaded portion is the current location of the cursor in FIG. 9A. The cursor moves right or left on the LCD 111 by user manipulation of the multi-function key 10 to the right or left. In step 807, the controller 11 moves the cursor to a specific digit that the user desires to select based on the key slides of the multi-function key 10 input by the user. Upon the user pressing down the multi-function key once for a short time with the cursor located on the specific digit in step 809, the controller 11 marks and displays the digit selected by the user with the digits displayed on the LCD 111 in step 811, as shown in FIG. 9B with [02-54]. In step 813, the controller 11 continuously checks whether the multi-function key 10 slides to the left or right, and if the multi-function key 10 slides the controller 11 returns to step 807. If the multi-function key is pressed down with a long press or the send key is pressed, the controller 11 considers that a dialing mode is set and dials a selected telephone number in step 817.

Instead of the dialing mode, a telephone number registering mode can be entered into as shown in step 819 of FIG. 8B by moving the cursor to "REG." displayed on the LCD 111 and pressing down the multi-function key. An example of a display is shown in FIG. 9C. In step 821 the controller 11 displays on the LCD 111 addresses at which to store the telephone number to be registered. In step 823 the user selects an address by sliding the multi-function key to the left or right while viewing the addresses displayed on the LCD 111, and in step 825, the user presses down the multi-function key shortly to confirm the selected address. Then, the controller 11 goes to step 827. If no address is selected, the controller 11 returns to step 823. FIG. 9D shows the LCD window 111 displaying an address selected and confirmed.

Upon entry of a long key press of the multi-function key or a press of the end key representative of a completed registration in step 827, the controller 11 in step 829 registers the telephone number at the determined address. Then, in step 831, the controller 11 transfers the function mode to a stand-by mode, initializes the LCD 111, and ends the procedure. The above example is one where the user registers a telephone number without a name.

In the alternative, in step 827, if the user desires to register a telephone number with a name key instead of ending the registration, a character input mode is selected for name registration with use of the multi-function key, and the controller 11 sets the character input mode in step 900. The character-input mode is selected, for example, by pressing down the multi-function key twice or sliding the multi-function key to the left.

The character-input mode will be described in detail referring to FIG. 8C.

Upon selection of the character input mode, the controller 11 can display symbols (FIGS. 9E and 9F), digits (FIG. 9G), or letters (FIG. 10), depending on the character set the user selects. Because of size constraints, all of the digits and characters cannot be displayed fully at one time; an icon is displayed together with a set of digits/characters on the LCD 111 to allow the user to transfer to another set of digits/characters.

Upon selection of the character-input mode in step 900, the controller 11 displays a character menu on the LCD 111 in step 901. For example, the character menu items may include "1. English capital letters, 2. English small letters, 3. Symbols . . . " In step 903, the user selects an intended character set by sliding the multi-function key to the left or right. The selected character set is displayed on the LCD 111 in step 905.

In step 907, the user moves the cursor to a specific character by sliding the multi-function key to the left or right, and then, in step 909, the user selects the specific character by a short key press of the multi-function key. The controller 11 marks and displays the selected character among the characters displayed in step 911. Through a repetition of steps 907 to 913, intended characters can be selected. Meanwhile, the cursor shifts to another character by the user sliding the multi-function key to the left or right. A character on a different line may, for example, be selected by pressing down the multi-function key twice. If the user desires to select another character in the same character set in step 913, the procedure returns to step 907. If an intended character is in a different character set, the procedure returns to step 903 by the user selecting an icon indicating to display a different character set through the "OR" step 914.

If the selected characters are confirmed by pressing down the multi-function key in step 915, the controller 11 ends the character input mode in step 917. In step 919, the controller 11 registers the user entered telephone number and name at the address selected in steps 823 and 825 and returns to step 831, thereby ending the procedure.

FIG. 10 illustrates an English capital letter input mode using the multi-function key. As an illustration, "HIT" is entered by way of example. Upon selection of "CAPs" in FIG. 9G, English capital letters are displayed. Among them, "H" is selected by shifting to "GH" by a left or right slide of the multi-function key and pressing down the multi-function key twice while the blinking cursor is located on "GH". "I" is entered by shifting to "IJ" by a left or right key slide of the multi-function key and pressing down the multi-function key once while the blinking cursor is located on "IJ". Then "T" is entered by shifting to "ST" by a left or right slide of the multi-function key and pressing down the multi-function key twice while the blinking cursor is located on "ST". Thus, "HIT" is completely displayed, and through a final manipulation of the multi-function key "HIT" is registered along with the telephone number, as shown in step 919.

As described above, through the use of a single multi-function key the present invention implements, for example, entry, registration, dialing of telephone numbers, character input, shifting between menu items, and setting functions. Any number of other and different functions can be implemented depending on the initial programming of the menu items.

Figure 11:
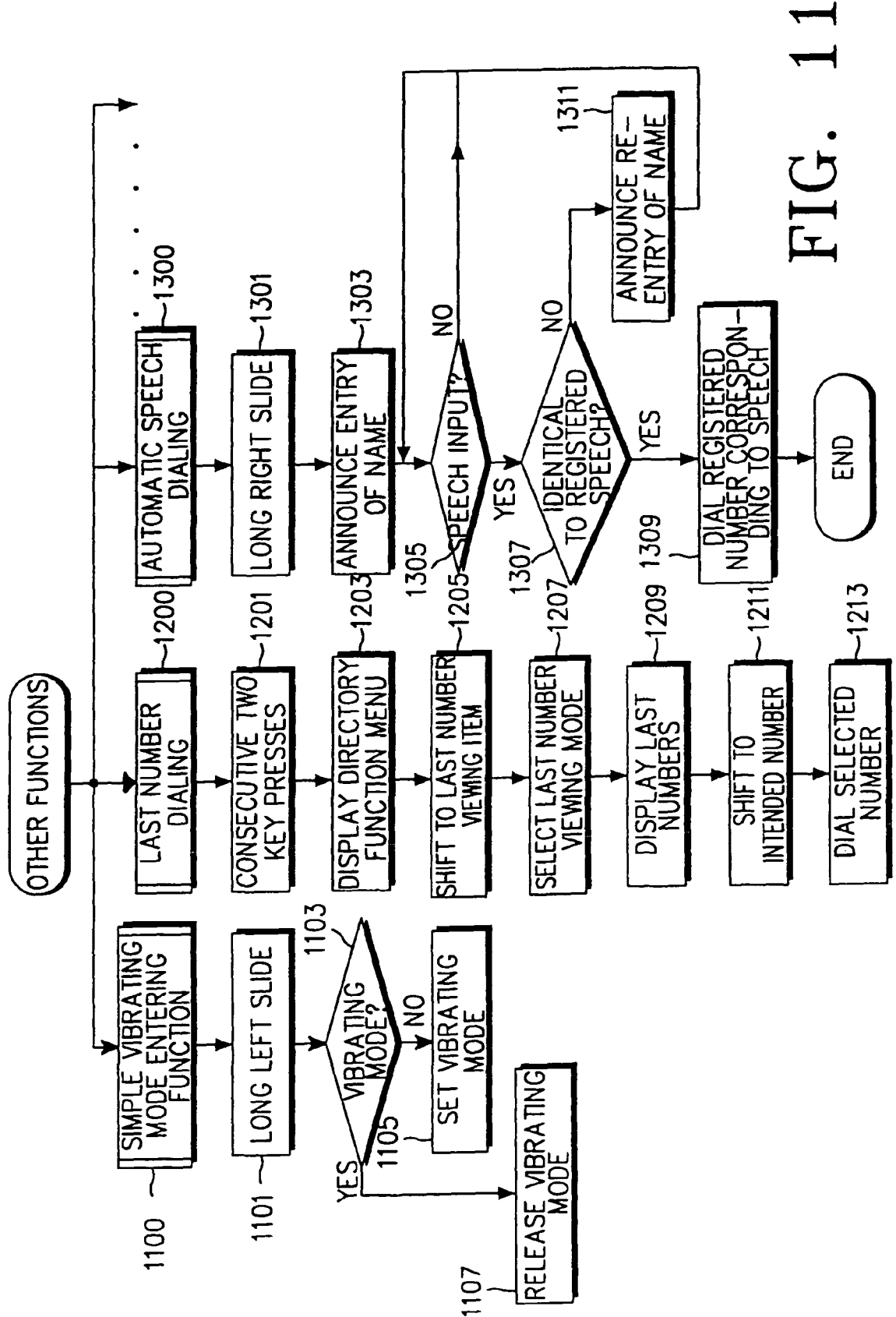
FIG. 11 is a flowchart illustrating the method for using a multi-function key for implementing other special functions according to an embodiment of the present invention.

FIG. 11 is a flowchart illustrating the method of using the multi-function key for implementation of other special functions according to an embodiment of the present invention. Referring to FIGS. 1 to 7 and FIG. 11, a simple vibrating mode setting function, a last number dialing function, and automatic speech dialing using the multi-function key will be described. Other functions in the function menu list shown in FIG. 5 can be implemented in the same manner. In this and other embodiments of the present invention a user can exit a particular function by pressing a predetermined key, for example an "Exit Function" key.

For example, a vibrating mode setting function 1100 is entered into if an input signal of a long left slide of the multi-function key is generated by the user while the phone is in a stand-by state in step 1101. The controller 11 determines whether a vibrating mode has been set in step 1103. If the vibrating mode has been set, the controller 11 releases the vibrating mode in step 1107. Otherwise, the controller 11 sets the vibrating mode in step 1105.

As another example a last number dialing function 1200 can be implemented if the multi-function key is pressed down twice successively in step 1201. In step 1203, the controller 11 displays a telephone number directory function menu on the LCD 111. Then in step 1205, a user slides the multi-function key to the left or right to shift to a last number viewing menu item. To shift to another menu item, the user performs a short left or a short right slide of the multi-function key. In step 1209, if the user inputs a short press of the multi-function key with the cursor blinking on the last number viewing menu item, the controller 11 selects the last number-viewing mode and displays a list of previously dialed telephone numbers. In step 1211, the controller 11 shifts to an intended last number by user sliding the multi-function key to the left or right. Upon the user pressing down the multi-function key once, the controller 11 in step 1213 dials the selected last number.

As another example, for an automatic speech dialing function 1300, upon receipt of an input signal representative of long right slide of the multi-function key in step 1301, the controller 11 in step 1303 outputs an announcement through the speaker 113 requesting entry of a name. In step 1305, the controller 11 determines whether voice has been input through the microphone 114. Upon receipt of a voice speech input, the controller 11 compares, in step 1307, the received voice speech input with previously registered voice inputs. If a match is found, the controller 11, in step 1309, automatically dials the telephone number in the previously registered location. If they are different, the controller 11, in step 1311, outputs through the speaker 113 an announcement requesting re-input of a voice speech input and returns to step 1305 awaiting a voice speech input that matches a registered voice input.

As described above, the method of using the multi-function key of the present invention is advantageous in that an area occupied by the conventional 3×4 alphanumeric keys is saved and digits/characters are entered more easily and more conveniently since multiple functions and entries are invoked by the manipulation of a single multi-function key.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for navigating through and selecting one of a plurality of menus in a portable terminal including a display and a cursor, the method comprising the steps of:
   providing the portable terminal with only a single key, wherein the single key is a multi-function key generating a plurality of key input signals respectively by a plurality of key manipulation methods including at least a first key manipulation method and a second key manipulation method, each method of the key manipulation methods being different from the other key manipulation methods, and the plurality of key manipulation methods comprising at least a short press at least once, a long press at least once, a short slide right, a long slide right, a short slide left, and a long slide left, wherein the single key returns to center after sliding;
   displaying the plurality of menus on the display by manipulating the multi-function key by the first key manipulation method;
   moving the cursor from one of the plurality of menus to an adjacent menu by manipulating the multi-function key by the second key manipulation method, the second key manipulation method being different from the first key manipulation method; and
   selecting a specific menu by manipulating the multi-function key by the first key manipulation method when the cursor is located on the specific menu.

2. The method of claim 1, further comprising the step of, if there is any submenu in the selected menu, selecting the submenu by repeating the displaying, moving and selecting steps.

3. The method of claim 1, wherein the first key manipulation method and the second key manipulation method are defined as the number of manipulations of the multi-function key.

4. The method of claim 1, wherein the manipulation of the multi-function key is achieved by rotating the multi-function key.

5. A method for navigating and selecting a character/numeral in a portable terminal including a display and a cursor, the method comprising the steps of:
- providing the portable terminal with only a single key, wherein the single key is a multi-function key generating a plurality of key input signals respectively by a plurality of key manipulation methods including at least a first-period manipulation and a second-period manipulation, each method of the key manipulation methods being different from the other key manipulation methods, and the plurality of key manipulation methods comprising at least a short press at least once, a long press at least once, a short slide right, a long slide right, a short slide left, and a long slide left, wherein the single key returns to center after sliding;
- displaying a character/numeral input state by manipulating the multi-function key according to the first-period manipulation;
- moving the cursor from one of characters/numerals displayed in the character/numeral input state to an adjacent one by manipulating the multi-function key according to the second-period manipulation, the second-period manipulation being different from the first-period manipulation; and
- selecting a specific character/numeral by manipulating the multi-function key by the first key manipulation method when the cursor is located on the specific menu.

6. The method of claim 5, further comprising the steps of:
- displaying character/numeral types according to the first-period manipulation of the multi-function key;
- moving the cursor from one of the character/numeral types to an adjacent one according to the second-period manipulation of the multi-function key; and
- displaying a character/numeral input state for the specific character/numeral type according to the first-period manipulation of the multi-function key when the cursor is located on the specific character/numeral type.

7. The method of claim 5, further comprising the step of selecting and displaying characters/numerals by repeating the displaying, moving and displaying steps, and ending the character/numeral input process according to the first-period manipulation of the multi-function key.

8. The method of claim 5, further comprising the step of selecting and displaying numerals by repeating the displaying, moving and displaying steps, recognizing the displayed numerals as a telephone number according to the first-period manipulation of the multi-function key, and performing a dialing function using the telephone number.

9. The method of claim 5, wherein the first period and the second period are defined as the number of manipulations of the multi-function key.

10. The method of claim 6, wherein the first period and the second period are defined as the number of manipulations of the multi-function key.

11. The method of claim 5, wherein the manipulation of the multi-function key is achieved by pressing the multi-function key.

12. The method of claim 5, wherein the manipulation of the multi-function key is achieved by rotating the multi-function key.

13. The method of claim 6, wherein the manipulation of the multi-function key is achieved by rotating the multi-function key.

14. The method of claim 5, wherein the characters include Korean characters, English characters, Chinese numerals, and special characters.

* * * * *